United States Patent
Kunihiro et al.

(10) Patent No.: US 11,491,709 B2
(45) Date of Patent: Nov. 8, 2022

(54) PHOTO-CURABLE RESIN COMPOSITION FOR THREE-DIMENSIONAL MOLDING, METHOD FOR THREE-DIMENSIONAL MOLDING USING THE SAME, AND THREE-DIMENSIONAL MOLDED PRODUCT

(71) Applicant: KJ CHEMICALS CORPORATION, Tokyo (JP)

(72) Inventors: Yoshio Kunihiro, Kumamoto (JP); Yuya Ishimaru, Kumamoto (JP); Toshitsugu Kiyosada, Kumamoto (JP)

(73) Assignee: KJ CHEMICALS CORPORATION, Tokyo (JP)

( * ) Notice: Subject to any disclaimer, the term of this patent is extended or adjusted under 35 U.S.C. 154(b) by 111 days.

(21) Appl. No.: 16/955,661

(22) PCT Filed: Jun. 24, 2019

(86) PCT No.: PCT/JP2019/024997
§ 371 (c)(1),
(2) Date: Jun. 18, 2020

(87) PCT Pub. No.: WO2020/004344
PCT Pub. Date: Jan. 2, 2020

(65) Prior Publication Data
US 2021/0008791 A1    Jan. 14, 2021

(30) Foreign Application Priority Data

Jun. 25, 2018  (JP) .............................. JP2018-120317

(51) Int. Cl.
| | | |
|---|---|---|
| *C08F 2/46* | (2006.01) | |
| *C08F 2/50* | (2006.01) | |
| *C08G 61/04* | (2006.01) | |
| *B29C 64/124* | (2017.01) | |
| *B29C 64/264* | (2017.01) | |
| *B29C 64/209* | (2017.01) | |
| *C08F 299/06* | (2006.01) | |
| *C08F 2/48* | (2006.01) | |
| *C08F 299/02* | (2006.01) | |
| *C08F 290/06* | (2006.01) | |
| *B33Y 10/00* | (2015.01) | |
| *B33Y 70/00* | (2020.01) | |
| *B29K 33/00* | (2006.01) | |
| *B29K 103/08* | (2006.01) | |
| *B29K 105/00* | (2006.01) | |

(52) U.S. Cl.
CPC ......... *B29C 64/124* (2017.08); *B29C 64/209* (2017.08); *B29C 64/264* (2017.08); *C08F 2/46* (2013.01); *C08F 2/48* (2013.01); *C08F 290/067* (2013.01); *C08F 299/02* (2013.01); *C08F 299/065* (2013.01); *B29K 2033/26* (2013.01); *B29K 2103/08* (2013.01); *B29K 2105/0061* (2013.01); *B33Y 10/00* (2014.12); *B33Y 70/00* (2014.12)

(58) Field of Classification Search
CPC ............. C08F 290/067; C08F 290/147; C08F 299/065; C08F 299/02; C08F 2/48; C08F 2/46; C08F 220/58; C08F 220/54; B29K 2033/26; B29K 2105/0061; B29K 2103/08; B29C 64/209; B29C 64/264; B29C 64/124; B29C 64/106; B33Y 80/00; B33Y 70/00; B33Y 10/00
USPC ........................ 522/6, 189, 184, 71, 1; 520/1
See application file for complete search history.

(56) References Cited

U.S. PATENT DOCUMENTS

| | | |
|---|---|---|
| 6,017,973 A | 1/2000 | Tamura et al. |
| 9,738,748 B2 | 8/2017 | Takenouchi et al. |

FOREIGN PATENT DOCUMENTS

| | | |
|---|---|---|
| EP | 3 121 209 A1 | 1/2017 |
| JP | 02-130132 | 5/1990 |
| JP | 03-160013 | 7/1991 |
| JP | 07-138333 | 5/1995 |
| JP | 09-169827 | 6/1997 |
| JP | 2002-080509 | 3/2002 |
| JP | 2002-338638 | 11/2002 |
| JP | 2004-238597 | 8/2004 |
| JP | 2015-010170 | 1/2015 |
| JP | 2015010170 * | 1/2015 |
| JP | 2017-048288 | 3/2017 |
| JP | 2018-039962 | 3/2018 |

OTHER PUBLICATIONS

JP2018039962A—Machine Translation (Year: 2018).*
Ishizaki et al, JP 2015010170 Machine Translation, Jan. 19, 2015 (Year: 2015).*
Official Communication issued in International Patent Application No. PCT/JP2019/024997, dated Sep. 3, 2019, along with an English translation thereof.

* cited by examiner

*Primary Examiner* — Jessica Whiteley
(74) *Attorney, Agent, or Firm* — Greenblum & Bernstein, P.L.C.

(57) ABSTRACT

A photo-curable resin composition for three-dimensional molding which does not require a support material is provided and can be cured by light irradiation while being extruded from a nozzle through a simple FDM method to be stacked and molded in a short period of time. The photo-curable resin composition has a viscosity at 20° C. of 0.2 Pa·s or more and a viscosity at 150° C. of 1000 Pa·s or less.

16 Claims, No Drawings

PHOTO-CURABLE RESIN COMPOSITION FOR THREE-DIMENSIONAL MOLDING, METHOD FOR THREE-DIMENSIONAL MOLDING USING THE SAME, AND THREE-DIMENSIONAL MOLDED PRODUCT

TECHNICAL FIELD

The present invention relates to a photo-curable resin composition for three-dimensional molding, a method for three-dimensional molding using the same, and a three-dimensional molded product obtained thereby.

BACKGROUND ART

A three-dimensional molding technique is a technique in which layers of various materials such as thermoplastic resin, photo-curable resin, powder resin, and powder metal are stacked through methods such as fused deposition molding, photo-molding, gypsum powder molding, and powder sintering lamination molding to obtain a target three-dimensional molded product. Since a molded product can be directly obtained from geometric data and complicated shapes such as a hollow or mesh shape can be integrally molded, the applicable field of three-dimensional molding technique is spreading, starting from the manufacture of small-lot or made-to-order test models to the medical field, aviation industry, industrial robots, and the like.

Molding apparatuses generally called 3D printers are used to obtain three-dimensional molded products. Specifically, 3D printers of an inkjet UV curing type (also called material jetting, UV-IJ3D printers) which uses a photo-curable resin such as acrylic, a fused deposition molding type (material extrusion deposition method/FDM) which uses a thermoplastic resin such as acrylonitrile-butadiene-styrene resin, a liquid-bath photopolymerization type (SLA, DLP) in which a liquid photo-curable resin is irradiated with ultraviolet light and layers of the resin are cured and stacked layer by layer, a powder sintering lamination type (SLS, SLM) in which a powder material is irradiated with a laser beam to be sintered, and of a like type are known.

In FDM, a resin melted mainly by heat is extruded from a nozzle and solidified by cooling, and the resin is stacked to mold a model. Advantages of this method is that a molded product having approximately the same practical strength as a plastic product can be produced, and that it is suitable for molding prototypes, jigs, simplified molds, and the like. However, since there is a risk that the molded product may be deformed due to its own weight, a support for supporting the shape is necessary to prevent deformation of the molded product particularly when using a soft material or when producing a hollow structure. Also, since a resin material is melted and stacked, there were demerits such as overly distinct cross-section (stacking scars) and lack of surface smoothness.

In material jetting, a photo-curable resin is injected from an inkjet head, and the resin is solidified by means of UV light or the like and stacked to mold a model, and high-precision models with a smooth surface can be easily molded. Also, depending on the type of the molding apparatus, multiple materials can be selected and mixed for use. However, since the biggest feature of this method lies in molding an object from ink-like fine particles, it is necessary to inject the photo-curable resin itself used as the modeling material and support material in the form of an ink from the nozzle at high speed so that droplets of the ink fly at high speed and precisely land on a base material such as paper or substrate, and to cure the ink by UV irradiation. Reduction of the viscosity of the ink (normally less than 20 mPa·s) has therefore been an important issue and the use of a high-viscosity photo-curable resin was difficult. In addition, since a low-viscosity photo-curable resin has a low molecular weight, it was difficult to obtain molded products having the mechanical strength and impact resistance comparable to engineering plastics such as ABS.

SLA and DLP are methods in which a liquid resin is cured by light irradiation, and molding had to be carried out while maintaining the temperature at around room temperature (25° C.) to prevent expansion or shrinkage of the liquid resin caused by the environmental temperature. As a result, 3D data can be correctly reproduced and high-precision molding can be realized, but, on the other hand, molding by using a high-viscosity curable resin was not possible. Also, since compositional change and viscosity increase due to volatilization of the resin component in the liquid tank and temporal reduction of the liquid viscosity particularly due to moisture absorption are likely to occur, it was necessary to use non-volatile components alone or to maintain a constant humidity. In addition, when using engineering resin, castable resin, or the like, it was necessary to carry out secondary curing to secure strength. Furthermore, maintenance operation and post-processing steps are very complicated since a separate resin tank is necessary for each resin, the platform needs to be washed with isopropyl alcohol or the like when changing the materials used, and uncured liquid resin needs to be removed when pulling up a three-dimensional molded product from the liquid resin tank after molding.

The step for removing the support material from the three-dimensional molded product after molding is also required in FDM, material jetting, SLA, and DLP. However, removal of the support material after molding is not easy in these methods. Since a support material is fused, adhered, or bonded with the target molded product, it is normally manually removed from a molded product with the use of a spatula, a brush, or the like, blown off by water jet, or removed by a like method. A careful work is required since there is a risk of breaking the three-dimensional molded product, and the removal step has therefore been a heavy burden.

As a method for obtaining a target three-dimensional molded product without using a support material, a method for producing a three-dimensional molded product in which a special photo-curable resin is dispensed from a nozzle in the form of a string and is cured by light irradiation while maintaining the string-like shape and, at the same time, layers of the resin are stacked was proposed (Patent Literature 1). By using a photo-curable resin having excellent thixotropic properties in this method, the photo-curable resin is fluid at the point of being dispensed from the nozzle but becomes still and the viscosity rapidly increases after being dispensed, and the resin is cured without changing the dispensed shape. This method avoids problems such as spreading of uncured resin to unwanted parts and smearing caused by adhesion of the resin to surrounding parts, but it is very difficult to maintain constant thickness and shape of the string-like cured product, and there were problems that fine strings were difficult to produce and products with high molding precision could not be obtained. Also, spaces are formed between the strings and the surface becomes uneven when producing a flat molded product by this method, and satisfactory strength and appearance of the molded product could not be obtained. In addition, since a thixotropic resin material needs to be agitated to maintain fluidity, a nozzle with an agitation function is necessary to quantitatively dispense the resin. Thus, there were problems in terms of complication of the molding apparatus and cost increase.

CITATION LIST

Patent Literature

Patent Literature 1: JP 1990-130132 (A)

SUMMARY OF INVENTION

Technical Problem

The object of the present invention is to provide a photo-curable resin composition for three-dimensional molding which does not require a support material and which can be stacked and molded in a short period of time through extruding the photo-curable resin by a simple FDM method and irradiating the same with light at the same time. The object of the present invention also lies in providing an three-dimensional photo-molding method in which a step of dispensing the photo-curable resin composition from a nozzle in the form of a sol and a step of curing the resin by light irradiation are carried out at the same time, and in providing a three-dimensional molded product obtained thereby which does not require washing and which has excellent surface tack-free property, surface smoothness, surface hardness, weather resistance, abrasion resistance, and mechanical properties such as tensile strength and impact resistance, and, at the same time, has flexibility, toughness, and elongation.

Solution to Problem

As a result of intensive studies to solve the aforementioned problems, the inventors of the present invention found that a photo-curable resin composition having a viscosity at 20° C. of 0.2 Pa·s or more and a viscosity at 150° C. of 1000 Pa·s or less can solve the aforementioned problems and arrived at the present invention.

The present invention provides (1) a resin composition for three-dimensional photo-molding having a viscosity at 20° C. of 0.2 Pa·s or more and a viscosity at 150° C. of 1000 Pa·s or less;
(2) the resin composition for three-dimensional photo-molding as described in (1) composed of 50 to 100% by mass of a group of unsaturated compounds consisting of compounds having one or more unsaturated groups in a molecule and 0 to 50% by mass of a photoinitiator;
(3) the resin composition for three-dimensional photo-molding as described in (1) or (2) having a curing shrinkage of 5% or less;
(4) the resin composition for three-dimensional photo-molding as described in any one of (1) to (3) having a thixotropic index of 0.9 to 1.1;
(5) the resin composition for three-dimensional photo-molding as described in any one of (1) to (4) having a viscosity of 0.1 Pa·s or more and 1000 Pa·s or less at molding temperature;
(6) the resin composition for three-dimensional photo-molding as described in any one of (1) to (5) having a coefficient of curing depth of 0.1 mm or more;
(7) the resin composition for three-dimensional photo-molding as described in any one of (1) to (6) comprising as unsaturated group one or more unsaturated groups selected from a (meth)acrylate group, a (meth)acrylamide group, a maleimide group, a vinyl group, and an allyl group;
(8) a photo-curable ink comprising a resin composition as described in any one of (1) to (7) and having a viscosity at 20° C. of 0.2 Pa·s or more;
(9) a photo-curable shape-memory resin composition comprising a resin composition as described in any one of (1) to (7);
(10) a photo-curable clay comprising a resin composition as described in any one of (1) to (7);
(11) a three-dimensional photo-molding method comprising simultaneously carrying out a step of dispensing a resin composition as described in any one of (1) to (7) and/or a photo-curable ink as described in (8) from a nozzle in the form of a sol and a step of curing the resin composition and/or the photo-curable ink by means of light irradiation;
(12) a three-dimensional photo-molded product obtained by curing a resin composition for three-dimensional photo-molding as described in any one of (1) to (7) and/or a photo-curable ink as described in (8) by means of light irradiation;
(13) a shape-memory molded product obtained by curing a photo-curable shape-memory resin composition as described in (9) by means of light irradiation;
(14) a clay molded product obtained by curing a photo-curable clay as described in (10) by means of light irradiation.

Advantageous Effects of Invention

The photo-curable resin composition for three-dimensional molding of the present invention has a viscosity at 20° C. of 0.2 Pa·s or more and a viscosity at 150° C. of 1000 Pa·s or less, and the photo-curable resin can be easily dispensed from a nozzle at the molding temperature by means of FDM. Also, the resin does not overly spread since it has a high viscosity, and the resin can be flattened before curing since it is non-thixotropic. A molded product can therefore be obtained with high precision. In addition, since the photo-curable resin can be cured by irradiation with light, it can be immediately solidified after being dispensed, and can therefore be stacked and three-dimensionally molded in a short period of time. Furthermore, since dispensing and curing of the molding material are simultaneously carried out in the three-dimensional molding method of the present invention, no support material is used and non-curable components and oily additives are not contained on the surface of or inside the molded product. Thus, the obtained molded product has excellent curing characteristics and transparency, and does not require a washing step after molding.

The photo-curable resin composition of the present invention is composed of various unsaturated compounds, and various types of molded products can be easily produced by appropriately combining the unsaturated compounds. Also, the obtained molded products have excellent surface tack-free property, surface smoothness, surface hardness, weather resistance, abrasion resistance, and mechanical properties such as tensile strength and impact resistance and, at the same time, have flexibility, toughness, elongation, and shape-memory properties, and the resin composition can therefore be widely used for molded products utilizing the clay-like moldability, 3D-printed molded products, and the like. In addition, there are types of unsaturated groups with the function to generate radicals when irradiated with light which allow the use of an oligomer- or polymer-type photoinitiator instead of a normal photoinitiator. The molded product obtained will therefore be free from the odor or coloration derived from the residue and/or degradant of a normal photoinitiator.

DESCRIPTION OF EMBODIMENTS

The present invention will be described below in detail.

The photo-curable resin composition of the present invention is a material for three-dimensional molding and has a viscosity at 20° C. of 0.2 Pa·s or more and a viscosity at 150° C. of 1000 Pa·s or less. When the viscosity of the resin composition is within this range, it will be a fluid liquid at any molding temperature from 0° C. to 150° C. and can be quantitatively and easily dispensed with high precision by using an apparatus such as a quantitative syringe pump liquid-sending apparatus (e.g., syringe dispenser), a quantitative gear pump liquid-sending apparatus (e.g., gear dispenser), or the like. Since three-dimensional molding is generally carried out in an environment at 20 to 100° C., the viscosity of the resin composition is preferably 1 Pa·s or more at 20° C. and 500 Pa·s or less at 150° C., more preferably 10 Pa·s or more at 20° C. and 300 Pa·s or less at 150° C.

The photo-curable resin composition of the present invention is a material for three-dimensional molding, and if the resin composition has a viscosity of 0.1 Pa·s or more and 1000 Pa·s or less at the time of molding, a smooth molded surface can be formed by leveling the dispensed resin composition before it is cured. Also, the resin composition before curing can be prevented from flowing out onto an area outside the prescribed dispensing area, and molded products with high molding precision can be obtained. The viscosity of the resin composition is therefore preferably within the aforementioned range. The viscosity at the time of molding is more preferably 1 Pa·s or more and 500 Pa·s or less, particularly preferably 10 Pa·s or more and 100 Pa·s or less.

The photo-curable resin composition of the present invention has no or low thixotropic properties. If the resin composition has low thixotropic properties, the resin composition dispensed from the nozzle can be leveled before curing, and the thixotropic index (TI) of the resin composition at the time of molding is preferably from 0.9 to 1.1.

The feature of the photo-curable resin composition of the present invention lies in that it is dispensed in a liquid state from the nozzle onto a stage and is immediately solidified through light irradiation. Normally, volume shrinkage of a molded product often occurs as a liquid resin composition solidifies, but the volume shrinkage (curing shrinkage) of the photo-curable resin composition of the present invention due to solidification (curing) is 5% or less. If the curing shrinkage is 5% or less, sufficient molding precision can be secured by using additive manufacturing and photo-curing technique in which layers with a thickness of 1 mm or less are stacked and cured. Curing shrinkage is preferably 2% or less, more preferably 1% or less. Although curing shrinkage of a photo-curable resin normally tends to increase along with the increase of the content of unsaturated groups, the photo-curable resin composition of the present invention achieves low curing shrinkage by combining high-molecular-weight compounds having various unsaturated groups, compounds with excellent flexibility having unsaturated groups, and the like.

The photo-curable resin composition of the present invention is stacked while being dispensed from a nozzle to be molded. In this method, the layer thickness is often set to be 0.1 mm or more, and the coefficient of curing depth (Dp) of the resin is preferably 0.1 mm or more so as to sufficiently cure the resin composition layer by layer. Also, Dp is preferably 0.5 mm or more so as to perform photocuring throughout multiple layers by light irradiation during molding and to prevent troubles such as distortion and deformation during or after molding that are caused by the residual uncured resin.

The photo-curable resin composition of the present invention is composed of a group of unsaturated compounds which consists of compounds having one or more unsaturated groups in a molecule, and a photoinitiator, and the content of the group of unsaturated compounds (total amount of unsaturated compounds) is preferably 50% by mass or more, more preferably 70% by mass or more. Also, the content of the photoinitiator is preferably 50% by mass or less, more preferably 30% by mass or less.

The compounding ratio of the photoinitiator and the unsaturated compounds in the photo-curable resin composition is not particularly limited as long as the content of these components is within the aforementioned range. There are cases where the photo-curable resin composition can be cured at a sufficiently curing speed without using a photoinitiator depending on the molecular weight of the unsaturated compounds and the number and types of the unsaturated groups. Also, if the photoinitiator is of a high-molecular-weight type having a molecular weight of approximately 1000 to 100000, the coefficient of curing depth can be maintained at 0.1 mm or more and good molded products with a low curing shrinkage can be obtained even when the photoinitiator is added in an amount of up to 50% by mass. In other words, the compounding ratio (photoinitiator/unsaturated compounds) is from 0/100 to 50/50 (mass %). When the resin composition has a viscosity of 1 Pa·s or more at the molding temperature or when the unsaturated group equivalent amount is 5000 or more, the compounding ratio is preferably from 1/99 to 10/90 (mass %).

Monofunctional and/or polyfunctional low-molecular-weight compounds, medium-molecular-weight compounds, and high-molecular-weight compounds can be mentioned as the compounds having unsaturated groups used as the constituent components of the photo-curable resin composition of the present invention. Here, monofunctional means having only one unsaturated bond in a molecule and polyfunctional means having two or more unsaturated bonds in a molecule, and low molecular weight means compounds having a molecular weight of from 70 to less than 1000, medium molecular weight means compounds having a molecular weight of from 1000 to less than 10000, and high molecular weight means compounds having a molecular weight of 10000 or more. These monofunctional and/or polyfunctional low-molecular-weight compounds, medium-molecular-weight compounds, and high-molecular-weight compounds can be freely combined and mixed for use.

Unsaturated groups in the unsaturated compounds are one or more unsaturated groups selected from the group consisting of an acrylate group, a methacrylate group, an acrylamide group, a methacrylamide group, a maleimide group, a 2-substituted maleimide group, a 2,3-disubsituted maleimide group, a vinyl group, a vinylether group, a 2-alkylvinylether group, an allylether group, and a (meth) allylether group. An acrylate group, an acrylamide group, a maleimide group, or a vinyl ether group is preferably used alone or in combination in terms of obtaining excellent photocuring speed and coefficient of curing depth, and of well balancing the strength and elongation of the cured product. Also, when a photoinitiator is not added, it is particularly preferable that the unsaturated compounds contain as the unsaturated group at least one maleimide-based functional group which easily generate radicals, such as a maleimide group, a 2-substituted maleimide group, a 2,3-disubstituted maleimide group, or the like.

Monomers based on (meth)acrylate, (meth)acrylamide, vinyl, allyl, maleimide, vinyl ether, or the like, and oligomers with a molecular weight of less than 1000 obtained through homopolymerization and/or copolymerization can be mentioned as the monofunctional low-molecular-weight compounds. The monofunctional low-molecular-weight compounds can be used alone or in a combination of two or more types.

Examples of the monofunctional low-molecular-weight compounds include monomers, oligomers, and prepolymers having a monofunctional unsaturated group. Specific examples include (meth)acrylates, (meth)acrylamides, vinyl ethers, allyl ethers, maleimides, 2-substituted maleimides, 2,3-disubstituted maleimides, and the like into which a $C_{1-18}$ linear, branched or cyclic alkyl group, an alkenyl group, an aryl group, a hydroxyalkyl group, an alkyl group to which a heterocyclic ring is introduced, an oxoalkyl group, or the like is introduced, and alkyl carboxylic acid alkenyl esters such as vinyl acetate and allyl acetate. These monofunctional low-molecular-weight compounds can be used alone or in a combination of two or more types.

Examples of the polyfunctional low-molecular-weight compounds include monomers, oligomers, and prepolymers having a polyfunctional unsaturated group. Specific examples include di(meth)acrylates, di(meth)acrylamides, divinyl ethers, diallyl ethers, dimaleimides, di-2-substituted maleimides, and di-2,3-substituted maleimides in which both terminals of a $C_{1-18}$ linear, branched or cyclic alkylene diol, alkenyl diol, aryl diol, dialkylene glycol, trialkylene glycol, polyalkylene glycol, or caprolactone-modified dicyclopentenyl diol are esterified, amidated, imidized, or etherified, pentaerythrithol tetra(meth)acrylate, pentaerythrithol tri(meth)acrylate, dipentaerythrithol hexa(meth)acrylate, dipentaerythrithol penta(meth)acrylate, dipentaerythrithol tetra(meth)acrylate, trimethylolethane tri(meth)acrylate, trimethylolpropane tri(meth)acrylate, alkylene oxide-modified bisphenol A di(meth)acrylate, and polyfunctional oligomer-type epoxy di(meth)acrylates. Also, as polyfunctional low-molecular-weight compounds obtained through an addition reaction of a monofunctional low-molecular-weight compound having a hydroxyl group and an isocyanate group, addition reaction products with a polyisocyanate such as urethane adduct-type polyfunctional (meth)acrylates, polyfunctional (meth)acrylamides, polyfunctional vinyl ethers, polyfunctional allyl ethers, and maleimides such as polyfunctional maleimides, polyfunctional 2-substituted maleimides and polyfunctional 2,3-disubstituted maleimides, and addition reaction products with a urethane oligomer having isocyanate groups at both terminals such as urethane oligomer-type urethane di(meth)acrylates, urethane (meth)acrylamides, urethane vinyl ethers, urethane allyl ethers, urethane maleimides, urethane 2-substituted maleimides, urethane 2,3-disubstituted maleimides, and the like can be mentioned. These polyfunctional low-molecular-weight compounds can be used alone or in a combination of two or more types.

The photo-curable resin composition of the present invention has a viscosity at 20° C. of 0.2 Pa·s or more and a viscosity at 150° C. of 1000 Pa·s or less. The monofunctional and/or polyfunctional low-molecular-weight compounds, medium-molecular-weight compounds, and high-molecular-weight compounds can be freely combined and mixed so that the viscosity will be within this range, but a urethane prepolymer is preferably used as the monofunctional or polyfunctional medium-molecular-weight or high-molecular weight compounds. By using a urethane prepolymer, the viscosity during molding of the resin composition for three-dimensional photo-molding of the present invention can be adjusted to a suitable range, and suitable mechanical properties such as strength and impact resistance of the obtained molded products can be obtained in accordance with the purpose. Specifically, a photo-curable urethane prepolymer having an unsaturated group in the molecule can be mentioned, wherein the unsaturated group is one or more functional groups selected from the group consisting of an acrylate group, a methacrylate group, an acrylamide group, a methacrylamide group, a vinyl ether group, a 2-alkyl vinyl ether group, an allyl ether group, a (meth)allyl ether group, a maleimide group, a 2-substituted maleimide group, and a 2,3-disubstituted maleimide group.

The urethane prepolymer having an unsaturated group used in the present invention has a weight-average molecular weight of from 300 to 100000, preferably from 1000 to 80000, particularly preferably from 2000 to 50000. If the weight-average molecular weight is less than 300, there is a risk that the flexibility, elongation, and impact resistance of the molded product might deteriorate. Also, a weight-average molecular weight exceeding 100000 is not favorable since there is a risk that the viscosity of the urethane prepolymer and the photo-curable resin composition (C) of the present invention containing said prepolymer might dramatically increase and that the handleability might deteriorate, although it depends on the constitution of the composition.

There is no particular limitation to the urethane prepolymer having an unsaturated group used in the present invention, and the urethane prepolymer can be synthesized through known urethanization reaction technique. For example, a method in which a compound having an unsaturated group and a hydroxyl group is reacted with a compound having an isocyanate group, and a method in which a compound having an unsaturated group and an isocyanate group is reacted with a compound having a hydroxyl group can be mentioned as the synthesis method. Also, a high-molecular-weight urethane prepolymer having an unsaturated group can be easily obtained by using a polyisocyanate or a polyol having two or more functional groups.

The photo-curable resin composition of the present invention can be completely cured by means of light irradiation. The light used here means, among electromagnetic waves and charged particle radiation, a light having an energy quantum, i.e., active energy rays such as visible light, electron beam, ultraviolet ray, infrared ray, X-ray, α-ray, β-ray, and γ-ray. Examples of the radiation source include high-pressure mercury lamps, halogen lamps, xenon lamps, metal halide lamps, LED lamps, electron beam accelerators, and radioactive elements. The light for irradiation is preferably an ultraviolet ray in terms of the cure speed of the photo-curable resin composition for three-dimensional modeling (C) of the present invention and the low harmfulness.

The amount of light irradiation (integrated quantity of light) necessary for curing the photo-curable resin composition of the present invention is preferably from 10 to 3000 mJ/cm$^2$, particularly preferably from 100 to 2000 mJ/cm$^2$, although it varies depending on the structure, molecular weight, and type and number of the unsaturated groups of the unsaturated compounds which constitute the photo-curable resin composition. If the integrated quantity of light is less than 10 mJ/cm$^2$, there is a risk that insufficiently cured parts may remain and that the strength, elongation, and water resistance of the cured product may deteriorate. Also, an integrated quantity of light exceeding 3000 mJ/cm$^2$ is unfavorable since side reactions such as decomposition occur due to excessive light irradiation and coloration of the cured film is likely to occur.

When using a urethane prepolymer (A) having, as an unsaturated group, at last one functional group having a photopolymerization-initiating function (this type of unsaturated group is also called a photofunctional unsaturated group) such as a maleimide group, curing reaction of the photo-curable resin composition of the present invention will proceed and a cured product can be obtained through light irradiation even without a photoinitiator or a photosensitizer. When using a urethane prepolymer (B) which does not have a photofunctional unsaturated group, the urethane prepolymer (B) can be used by mixing it with A at a given ratio or by combining B with a photoinitiator.

As the photoinitiator, those which photopolymerize unsaturated bonds in the photo-curable resin composition can be mentioned. Examples include radical photoinitiators, cationic photoinitiators, and anionic photoinitiators, and known photoinitiators can be used. A radical photoinitiator can be freely selected from ordinary radical photoinitiators based on acetophenone, benzoin, benzophenone, α-amino ketones, xanthones, anthraquinone, acyl phosphine oxides, polymeric pohtoinitiators, and the like. For example, acetophenones include diethoxyacetophenone, 2,2-dimethoxy-1, 2-diphenylethan-1-one, 2-hydroxy-2-methyl-1-phenylpropan-1-one, 1-(4-isopropylphenyl)-2-hydroxy-2-methylpropan-1-one, 4-(2-hydroxyethoxy)-phenyl-(2-hydroxy-2-propyl)ketone, 1-hydroxycyclohexyl phenylketone, and 2-methyl-1-(4-methylthiophenyl)-2-morpholinopropane-1; benzoins include benzoin, α-methylbenzoin, α-phenylbenzoin, α-allylbenzoin, α-benzoylbenzoin, benzoin methyl ether, benzoin ethyl ether, benzoin isopropyl ether, benzoin isobutyl ether, and benzyl dimethyl ketal; benzophenones include benzophenone, benzoyl benzoate, and methyl benzoyl benzoate; α-amino ketones include 2-methyl-1-(4-methylthiophenyl)-2-(4-morpholinyl)-1-propanone, 2-benzyl-2-(dimethylamino)-1-(4-(4-morpholinyl)phenyl)-1-butanone, and 2-(dimethylamino)-2-(4-methylphenyl)methyl-1-(4-(4-morpholinyl)phenyl)-1-butanone; xanthones include xanthone and thioxanthone; anthraquinones include anthraquinone, 2-methyl anthraquinone, and 2-ethyl anthraquinone; acyl phosphine oxides include bis(2, 4,6-trimethylbenzoyl)-phenylphosphine oxide and 2,4,6-trimethylbenzoyl-diphenyl-phosphine oxide; polymeric photoinitiators include polymers of 2-hydroxy-2-methyl-1-(4-(1-methylvinyl)phenyl)propan-1-one, diesters of carboxy methoxy benzophenone and polytetramethylene glycol having various molecular weights (preferably from 200 to 250), polymeric benzophenone derivatives (e.g., trade names Omnipol BP, Genopol BP), polymeric thioxanthones (diesters of carboxymethoxy thioxantone and a polytetramethylene glycol having various molecular weights; e.g., trade name Omnipol TX), polymeric α-amino ketones (diesters of a carboxyethoxy thioxanthone and a polyethylene glycol having various molecular weights, e.g., trade names Omnipol 910, Omnipol 9210), and SpeedCure 7010 (manufactured by Lambson).

As the cationic photoinitiator, antimony-based initiators such as diphenyliodonium hexafluoroarsenate, and non-antimony-based initiators such as triphenylsulfonium tetrafluoroborate and bis(4-t-butylphenyl)iodonium hexafluorophosphate can be mentioned. As the anionic photoinitiator, initiators such as acetophenone O-benzoyloxime and 2-(9-oxoxanthen-2-yl) propionic acid 1,5,7-triazabicyclo[4.4.0] dec-5-ene can be mentioned. These photoinitiators can be used alone or in a combination of two or more types.

The photo-curable resin composition of the present invention may contain a photosensitizer within a range that does not affect its effect. It is preferable for the photo-curable resin composition to contain a photosensitizer to reduce the curing time and the light irradiation amount and to achieve excellent productivity. Known photosensitizers can be used and examples include anthracene compounds such as 9,10-dialkoxy anthracene compounds and 9,10-bis(dihydroxyalkoxy)anthracene, and thioxanthone compounds such as thioxanthone, 1-chloro-4-propoxythioxanthone, isopropylthioxanthone, 2,4-diethylthioxanthone, 2-butylthioxanthone, 2-chlorothioxanthone, 2-propoxythioxanthone, and polymeric thioxanthones. Added amount of the photosensitizer can be freely decided within a range that does not affect the effects of the present invention, but it is preferably from 0.01 to 10% by mass based on 100% by mass of the photo-curable resin composition. Polymeric photoinitiators and photosensitizers are preferably used in view of the odor and safety of the obtained molded product.

Pigments, dyes, and other additives can be added as necessary to color the photo-curable resin composition of the present invention within a range that does not inhibit the curability, moldability, physical properties of the molded product, and the like. Examples of the other additives include rheology control agents such as talc, fluorine compounds and silicone compounds added as a surface tension adjuster, surfactants, polymerization accelerators, stabilizing agents, organic plasticizers, antioxidants, flame retardants, antistatic agents, and leveling agents. There is no particular limitation to the added amount of other additives as long as it does not adversely affect the viscosity and mechanical properties of the photo-curable resin composition of the present invention. The added amount is preferably 5% by mass or less relative to the amount of the photo-curable resin composition.

Properties of the obtained cured product can be varied from hard to soft in accordance with the purpose and use by properly changing the composition of the photo-curable resin composition of the present invention within the viscosity range of the present invention. Toughness, flexibility, impact resistance, and high strength can be expected in hard molded products, and properties such as softness, elongation, adhesion, abrasion resistance, stress relaxation, low elasticity, low Young's modulus, scratch resistance, and vibration absorption can be imparted to soft molded products. Also, the cured product of the present invention can be deformed or processed by heating to a temperature equal to or higher than a prescribed temperature, the processed shape can be fixed by cooling after deformation or processing, the cured product has a shape-retention property, and the cured product can be deformed and the pre-processing shape can be recovered by heating again. That is, the photo-curable resin composition of the present invention can also be suitably used as a shape-memory resin. The photo-curable resin composition can also be used as a photo-curable clay which can be easily molded with fingertips at room temperature by selecting the constitution and molecular weight of the constituent components, adjusting the viscosity, etc. of the resin composition before curing.

The three-dimensional photo-molding method of one embodiment of the present invention is a method which comprises producing a three-dimensional molded product by material extrusion deposition (FDM) with a 3D printer by using the photo-curable resin composition and/or the photo-curable ink of the present invention. Specifically, in the method, a material feeding portion of a printer is filled with the photo-curable resin composition of the present invention used as a photo-curable ink, and a step of dispensing the ink from the nozzle in the form of a sol onto the molding area and a step of curing the ink by means of light irradiation are carried out at the same time. The photo-curable ink containing the resin composition of the present invention has a viscosity at 20° C. of 0.2 Pa·s or more.

There is no limitation to the method for outputting the photo-curable resin composition of the present invention, and a dispensing apparatus, for example, can be used for outputting the photo-curable resin composition. Examples of the outputting method include a method in which a liquid material is extruded by means of an air or solid plunger, a gear, a screw, or the like, and a method in which a liquid material inside a tube is extruded by rubbing the tube with a roller. Since the photo-curable resin composition is in the form of a liquid at the time of dispensing, and also from the viewpoint of handleability and workability, the photo-curable resin composition is preferably fluid in a part of or entire temperature range of 20° C. or more and 150° C. or less.

The photo-curable resin composition of the present invention can also be used by heating. For example, fluidity can be imparted and viscosity can be reduced at the same time by heating the resin composition to room temperature to 150° C. so that a container such as a tube or a syringe can be filled with the resin composition and the resin composition can be dispensed from a dispensing apparatus.

When molding a three-dimensional molded product by means of an FDM 3D printer with the use of the photo-curable resin composition and/or photo-curable ink of the present invention, the nozzle temperature is preferably from 20 to 150° C. Since the photo-curable resin composition of the present invention has a viscosity at 20° C. of 0.2 Pa·s or more and a viscosity at 150° C. of 1000 Pa·s or less, molding can be carried out at a lower temperature compared to molding an ordinary thermoplastic resin with an FDM 3D printer, and the difference between the temperature of the photo-curable resin composition during molding and the temperature of the obtained molded product is smaller than the case of molding an ordinary thermoplastic resin in the FDM method. Therefore, distortion caused by cooling the resin after molding is less likely to occur, and curing shrinkage caused by photocuring is suppressed. Curing shrinkage and distortion caused by cooling the resin after molding are therefore reduced, and molded products having less distortion compared to those obtained through an FDM method using a thermoplastic resin can be obtained.

There is no particular limitation to the light irradiation method as long as the photo-curable resin composition can be irradiated with light and cured while being dispensed. Examples of the light irradiation method include a method in which the structure of a three-dimensional photo-molded product is partially cured through surface irradiation by using a light source such as laser beam or by using a projector, and a method in which a resin composition for photo-molding output from a dispenser or the like is entirely cured through spot irradiation or surface irradiation.

The photo-curable resin composition of the present invention is cured by means of light irradiation at the same time as or immediately after (within 1 second after being dispensed) being output. Molding precision of the molded product can be improved and a more precise three-dimensional molded product can be obtained thereby. Also, since the resin composition is a liquid having a moderate viscosity range, leveling properties of the molded surface and the interlayer adhesion can be improved without giving time after outputting, and higher-strength and smoother three-dimensional molded products can be obtained.

Curing of the photo-curable resin composition of the present invention by light can be performed in the presence of air or in an inert gas atmosphere such as nitrogen. Photo-molding can be carried out and a molded product can be obtained either by a method in which an inert gas is directly blown to the output portion in air or by a method in which the atmosphere inside a molding chamber is an inert gas atmosphere such as nitrogen.

The photo-curable resin composition of the present invention provides sufficient curability and molding properties and good properties of three-dimensional molded products without containing low-molecular-weight initiators or low-molecular-weight polymerizable monomers or oligomers which cause odor. Also, even when a low-molecular-weight monomer or oligomer is used, since the composition has excellent curability and coefficient of curing depth, curing reaction completely proceeds also in an ordinary photo-molding method. Defects such as odor and surface stickiness of the cured product therefore do not occur, and since the washing step for removing residual monomers or the like steps are unnecessary, washing waste containing residual monomers and the like resulting from the washing step is not produced.

In general, when producing a molded product by means of photo-molding, there are cases where light irradiation is carried out with a least necessary amount of light exposure at the time of forming a molded product to enhance molding speed. In such cases, although the shape can be maintained, there are cases where sufficient curing is not achieved after molding. However, since a higher-strength and smoother three-dimensional molded product can be obtained by the photo-curable resin composition of the present invention which has improved molded surface-leveling properties and improved interlayer adhesion, a molded product with good light transmission and high coefficient of curing depth can be obtained. Therefore, even when molding is carried out with a least necessary amount of light irradiation, the light reaches inside the molded product when molding the uppermost layer at the time of stacking the layers and curing proceeds inside the molded product. Therefore, the use of a support material at the time of molding is unnecessary, and post-curing after molding is also unnecessary or only a least necessary post-curing at the uppermost molded portion is necessary. Coloration, deterioration, and the like of the molded resin due to excessive post-curing can therefore be minimized.

Since the molded product obtained by the present invention is cured by means of light irradiation after outputting a liquid photo-curable resin composition, stacking scars inside the molded product can be reduced compared to molded products obtained by an FDM method using an ordinary thermoplastic resin, and molded products having excellent airtightness and transparency can be obtained. The present invention is therefore applicable to molding containers and the like having high airtightness, for example.

Since the temperature of the photo-curable resin during molding is lower than the temperature of the resin in an FDM method using an ordinary thermoplastic resin, another structure can be easily incorporated in the three-dimensional molded product obtained by the present invention by stopping stacking of the layers during molding to place another structure, such as glass, metal, semiconductor, or the like, inside the molded product and restarting the molding process.

Since the photo-curable resin composition of the present invention and mixtures containing the photo-curable resin composition can be arranged to be easily deformable and yet have a very low fluidity at room temperature by adjusting the viscosity, the shape can be changed as with a clay and the resin composition and the mixtures can be used for filling holes at given places as with a repair putty. The viscosity at 20° C. is preferably from 500 to 1000000 Pa·s, more preferably from 1000 to 100000 Pa·s.

In the photo-curable resin composition of the present invention and mixtures containing the same, the photo-curable resin composition preferably has a loss tangent (tan δ) at 20° C. of 1 to 10. This loss tangent (tan δ) range is preferable in terms of easy handling since when the loss tangent (tan δ) is within this range, the photo-curable resin composition and the mixtures can be easily deformed at room temperature and have low tackiness and no stickiness, i.e., the photo-curable resin composition and the mixtures are in what is called a clay-like state, and since the resin composition and mixtures can be shaped or die cutting with fingertips, and can be photocured after shaping or die cutting. The loss tangent (tan δ) at 20° C. is more preferably from 2 to 5 or less. After molding with fingertips or by die cutting In regard to the specific use of the resin composition for three-dimensional photo-molding of the present invention, they can be effectively used in automobiles, electric appliances, furniture, and the like where mechanical properties such as strength, durability and flexibility are required, and as models, matrices, parts to be processed, and actual parts for dental health materials, medical appliances, electrical and electronic parts, and the like where fine and complicated structures are required. However, the use is not limited to these examples.

EXAMPLES

The present invention will be explained in detail below by reference to examples and comparative examples, but the present invention is not limited to the examples. Parts and % in the tables signify parts by mass and % by mass unless specified otherwise. Analysis of the photo-curable resin composition of the present invention and evaluation of the physical properties of the obtained cured product and molded product were performed by the methods explained below.

<Viscosity>

With the use of a rheometer (DISCOVERY HR-S, manufactured by TA Instruments), the viscosity (Pa·s) of Examples 1 to 25 and Comparative Examples 1 to 3 at 20° C., 60° C., and 100° C. was measured at a frequency of 1 Hz. The viscosity (Pa·s) at 150° C. was measured for Comparative Examples 4 and 5. When the viscosity at 60° C. or 100° C. was less than 0.5 Pa·s which is the measurement limit, it is marked <0.5 (Pa·s). When the viscosity at 20° C. was equal to or less than the measurement limit, the viscosity at 20° C. was measured in accordance with JIS K5600-2-3 with the use of a Brookfield viscometer (apparatus name: digital viscometer LV DV2T, manufactured by EKO Instruments).

<Coefficient of Curing Depth (Dp)>

A 75 μm-thick PET film was bonded to a transparent glass sheet, a spacer (length: 10 mm, width: 10 mm, thickness: 4 mm) was placed thereon, inner side of the spacer was filled with the photo-curable resin composition of the present invention, and a PET film lid was placed. The glass sheet filled with the composition was placed on a mount with a hole (circle with a diameter of 5 mm) on the bottom, and the composition was irradiated with light with three types of light exposure amount (E(mJ/cm$^2$)) so that the integrated quantity of light would be 10 mJ/cm$^2$, 50 mJ/cm$^2$, and 100 mJ/cm$^2$ (UV-A, 100 mW/cm$^2$) with the use of a UV light (UVF-204S Xe-Hg light source, manufactured by San-ei Electric) from the hole of the mount. After light irradiation, mold etc. was removed, most of the uncured composition on the PET film was removed, the cured product was washed with acetone for 1 hour together with the PET film then dried for 4 hours at 80° C., and the thickness of the cured product was measured with a film thickness gauge so as to measure the curing depth (Cd (mm)). The coefficient of curing depth (Dp (mm)) was calculated from the exposure amount (E) and curing depth (Cd) in accordance with the general formula (1) below. The threshold of light exposure amount necessary for curing the photo-curable resin composition was regarded as the critical light exposure amount (Ec). Since a measurable cured product could not be obtained and the coefficient of curing depth could not be calculated when the thickness of the cured product was equal to or less than 0.01 mm which is the measurement limit, the coefficient of curing depth is shown as <0.01 (mm) in such a case.

$$Cd = Dp \times \ln(E/Ec) \qquad \text{general formula (1)}$$

Cd: Curing depth (mm)
Dp: Coefficient of curing depth (mm)
E: Light exposure amount (mJ/cm$^2$)
Ec: Critical light exposure amount (mJ/cm$^2$)

<Tensile Strength, Elongation at Break>

A 75 μm heavy-release PET film (manufactured by Toyobo, polyester film E7001) was adhered to a horizontally placed glass sheet, a spacer with a thickness of 1 mm and an inner size of 60 mm×100 mm was placed, the inner side of the spacer was filled with the respective compositions of the examples and comparative examples, a 50 μm-thick light-release PET film (manufactured by Toyobo, polyester film E7002) was placed thereon, and the resin composition was cued by irradiation with ultraviolet light (apparatus: manufactured by Eye Graphics, inverter conveyor apparatus ECS-4011GX, metal halide lamp, illumination level: 700 mW/cm$^2$, integrated quantity of light: 1000 mJ/cm$^2$). Then, the release PET films on both sides were removed, and the obtained cured resin product was punched into No. 3 dumbbell shapes in accordance with JIS K6251 to obtain dumbbell-shaped specimens, and the tensile strength (MPa) and elongation at break (%) of the specimens were measured in accordance with JIS K7161 by using a desktop precision universal testing machine (manufactured by Shimadzu Corp., Autograph AGS-X) at an environmental temperature of 25° C., a tensile rate of 10 mm/min, and a grip distance of 50 mm.

<Curing Shrinkage>

As with the evaluation of the tensile strength and elongation at break, cured resin products were produced with the use of the compositions of the examples and comparative examples to obtain cured resin. Specific gravity ($S_0$) of the uncured composition and specific gravity ($S_1$) of the cured resin were measured with the use of an electronic hydrometer (MDS-300, manufactured by ALFA MIRAGE), and the curing shrinkage (%) was calculated in accordance with the following general formula (2).

$$\text{Curing shrinkage (\%)} = (S_1 - S_0)/S_1 \times 100\% \qquad \text{general formula (2)}$$

<Manufacture of Molded Product>

By using a 3D printer (Printrbot Simple Paste & Food Extruder) (nozzle inner diameter: 1.5 mm) equipped with a UV irradiation unit (UVF-204S, Xe-Hg light source, manufactured by San-ei Electric, UV-A100 mW/cm$^2$), manufacture of molded products was performed at a molding speed of 5 mm/sec and a stacked layer thickness of 0.4 mm at molding temperatures for the examples and comparative examples shown in Table 3. Molding data corresponded to the shape of the alphabet K (font: Arial bold) with a length of 30 mm, a width of 30 mm, and a thickness of 4 mm.

<Viscosity of Resin Composition at the Time of Molding>

The viscosity was measured in accordance with JIS K5600-2-3 with the use of a Brookfield viscometer (apparatus name: digital viscometer LV DV2T, manufactured by EKO Instruments) at the prescribed molding temperatures. For Comparative Examples 9 and 10, the viscosity (Pa·s) at 150° C. was measured at a frequency of 1 Hz with the use of a rheometer (DISCOVERY HR-S, manufactured by TA Instruments).

<Thixotropic Index (TI) of Resin Composition at the Time of Molding>

The viscosity ($\eta_0$) measured at a rotor rotation number ($R_0$) and the viscosity ($\eta_1$) at a rotor rotation number $R_1$ which is 1/10 of $R_0$ were measured at prescribed molding temperatures with the use of a Brookfield viscometer (apparatus name: digital viscometer LV DV2T, manufactured by EKO Instruments) so as to calculate the thixotropic index (TI) in accordance with the following general formula (3).

$$TI = \eta_0/\eta_1 \quad \text{general formula (3)}$$

<Molding Precision>

⊙: Photo-curable resin composition was cured, and the external dimension (X axis and Y axis directions) of the molded product was 97% or more and less than 103% of the molding data.

○: Photo-curable resin composition was cured, and the external dimension (X axis and Y axis directions) of the molded product was 95% or more and less than 97% or 103% or more and less than 105% of the molding data.

Δ: Photo-curable resin composition was cured, and the external dimension (X axis and Y axis directions) of the molded product was 90% or more and less than 95% or 105% or more and less than 110% of the molding data.

×: Curing of photo-curable resin composition was insufficient, or the external dimension (X axis and Y axis directions) of the molded product was less than 90% or 110% or more of the molding data.

<Cured State>

Cured state of the molded products manufactured by using a 3D printer in the evaluation of the molding properties was evaluated on the following three scales.

○: Surface of the cured product was completely tack-free, and no residual uncured composition was found.

Δ: Tackiness on the surface of the cured product and residual uncured composition were found.

×: Curing of the photo-curable resin composition was insufficient, and a large amount of residual uncured composition was found.

<Loss Tangent>

By using a rheometer (DISCOVERY HR-S, manufactured by TA Instruments), the storage modulus (G') and the loss modulus (G") of the photo-curable resin compositions and the comparative compositions at 20° C. were measured at a frequency of 1 Hz so as to calculate the loss tangent (tan δ) as a ratio of the storage modulus and the loss modulus, G"/G'.

<Tackiness>

The photo-curable resin compositions and the comparative compositions were pushed with a fingertip to a depth of 1 cm at 20° C. and then the fingertip was pulled out. Tackiness was evaluated on the four scales below in accordance with the state of the resin.

⊙: No adhesion of the resin composition to the fingertip, and no stickiness was confirmed.

○: No adhesion of the resin composition to the fingertip, but slight stickiness was confirmed.

Δ: Slight adhesion of the resin composition to the fingertip, and stickiness was confirmed.

×: Adhesion of the resin composition to the fingertip.

<State of Composition>

The photo-curable resin compositions and the comparative compositions were evaluated based on whether the state at 20° C. was clay-like or starch syrup-like.

Clay-like state: Resin composition has clay-like moldability and can be well molded with the fingertip etc.

Starch syrup-like state: Resin composition is in the form of a fluid and viscous liquid.

<Measurement of Rubber Hardness>

A 75 μm heavy-release PET film (manufactured by Toyobo, polyester film E7001) was adhered to a horizontally placed glass sheet, a spacer with a thickness of 3 mm and an inner size of 60 mm×100 mm was placed, the inner side of the respective spacers was filled with the photo-curable resin compositions of the examples and the compositions of the comparative compositions, a 50 μm-thick light-release PET film (manufactured by Toyobo, polyester film E7002) was placed thereon, and the resin composition was cured by irradiation with ultraviolet light (apparatus: manufactured by Eye Graphics, inverter conveyor apparatus ECS-4011GX, metal halide lamp: manufactured by Eye Graphics, M04-L41, UV illumination level: 700 mW/cm$^2$, integrated quantity of light: 1000 mJ/cm$^2$). Then, the release PET films on both sides were removed to obtain cured resin products of the examples and comparative examples. Shore D hardness was measured in accordance with JIS K6253 "method for testing rubber hardness" by layering two sheets of the specimens of the cured resin product.

<Shape Memory Property>

As with the aforementioned manufacture of the specimens for measuring rubber hardness, cured products of the photo-curable resin compositions of the examples and the comparative compositions were obtained. The cured products were heated to 70° C., the center portion was bent at right angle, and the cured products were cooled after deformation by immersing the same in 5° C. cold water to fix the shape. Then, the cured products were heated in a 60° C. oven without applying any external force to the bent portion to evaluate whether the shape before deformation was recovered.

○: The bent portion returned to a flat state within 5 minutes after being placed in the oven.

×: The bent portion was maintained 5 minutes after being placed in the oven.

Abbreviations in Table 1 have the following meanings.

A-1 to A-9: Urethane prepolymer having photofunctional unsaturated group (Weight-average molecular weight, viscosity at 20° C., 60° C. and 100° C., and type, number and basic structure of the unsaturated functional groups of each prepolymer are shown in Table 1.)

B-1 to B-4: Urethane prepolymer having no photofunctional unsaturated group (Weight-average molecular weight, viscosity at 20° C., 60° C. and 100° C., and type, number and basic structure of the unsaturated functional groups of each prepolymer are shown in Table 1.)

(F-1) to (F-3): Urethane compounds (Weight-average molecular weight, viscosity at 20° C., 60° C. and 100° C., and type, number and basic structure of the unsaturated functional groups of each compound are shown in Table 1.)

Example 1

Photo-Curable Resin Composition C-1

95 parts of A-1, 2 parts of B-1, and 3 parts of D-1 were agitated at 60° C. for 3 hours in a separable flask to obtain photo-curable resin composition C-1 in the form of a homogeneous and viscous liquid. The viscosity of the composition at 20° C., 60° C. and 100° C. is shown in Table 2.

Examples 2 to 25

Photo-Curable Resin Compositions C-2 to C-25

Photo-curable resin compositions C-2 to C-25 corresponding to Examples 2 to 25 were obtained in the same manner as in Example 1 with the compositions shown in Table 2. The viscosity of the compositions at 20° C., 60° C. and 100° C. is shown in Table 2.

Comparative Examples 1 to 5

Comparative Resin Compositions H-1 to H-5

Comparative resin compositions H-1 to H-5 corresponding to Comparative Examples 1 to 5 were obtained in the same manner as in Example 1 with the compositions shown in Table 2. The viscosity of the compositions at 20° C., 60° C. and 100° C. is shown in Table 2.

Abbreviations in Table 2 have the following meanings.

D-1: Hydroxyethyl acrylamide (registered trademarks "HEAA" and "Kohshylmer" manufactured by KJ Chemicals)

D-2: Diethyl acrylamide (registered trademarks "DEAA" and "Kohshylmer" manufactured by KJ Chemicals)

D-3: Acryloyl morpholine (registered trademarks "ACMO" and "Kohshylmer" manufactured by KJ Chemicals)

D-4: Dimethyl acrylamide (registered trademarks "DMAA" and "Kohshylmer" manufactured by KJ Chemicals)

D-5: Diacetone acrylamide (registered trademark "Kohshylmer" manufactured by KJ Chemicals)

D-6: Isopropylene acrylamide (registered trademarks "NIPAM" and "Kohshylmer" manufactured by KJ Chemicals D-7: NK ester A-600 (polyethylene glycol (number-average molecular weight: 600) diacrylate, manufactured by Shin-Nakamura Chemical)

I-1: Speedcure 7010 (polymeric initiator, manufactured by Lambson Japan)

I-2: Irgacure 184 (1-hydroxycyclohexyl phenyl ketone, manufactured by BASF Japan)

I-3: Irgacure TPO (diphenyl(2,4,6-trimethylbenzoyl) phosphine oxide, manufactured by BASF Japan)

Examples 26 to 50, Comparative Examples 6 to 10

Using the obtained photo-curable resin compositions C-1 to C-25 and the comparative resin compositions H-1 to H-5, the coefficient of curing depth (Dp), curing shrinkage, viscosity at the molding temperature, and thixotropic index (TI) were measured. Molding was performed with the use of a 3D printer to evaluate the molding precision. The results are shown in Table 3.

The evaluation results in Table 3 show that the coefficient of curing depth was 0.1 mm or more, meaning that curing reaction sufficiently proceeded to deep layers, in all of Examples 26 to 50 using the resin composition for photo-molding of the present invention. In addition, molded products with low curing shrinkage and good molding precision were obtained. In contrast, in Comparative Examples 6 and 7, curability was low and satisfactory molded products could not be obtained. In Comparative Example 8, the coefficient of curing depth was low, and each of the dispensed and stacked layers of the resin was cured only on the surface and a high amount of uncured resin remained inside the obtained molded product. In addition, the molding precision was low. In Comparative Example 9, the viscosity of the resin composition was too high and the resin composition could not be properly dispensed even at 100° C. Thus, the molding precision was notably low. Moreover, in Comparative Example 10, the curing reaction did not proceed and the molded product was deformed with time as the layers were stacked, and a satisfactory molded product could not be obtained.

Examples 51 to 69, Comparative Examples 11 to 13

By using photo-curable resin compositions C-1 to C-10 and C-17 to C-25, and comparative resin compositions H-1, H-4 and H-5, cured products were produced by UV irradiation and the tensile strength and the elongation at break of the obtained cured products were measured. The results are shown in Table 4.

The evaluation results in Table 4 show that the photocuring reaction sufficiently proceeded and a crosslinked structure was sufficiently formed in the obtained cured products in Examples 51 to 69 using the resin composition for photo-molding of the present invention. In addition, the cured products had fully satisfactory tensile strength and elongation at break. In contrast, in Comparative Example 11, the coefficient of curing depth was very low meaning that the curing reaction did not sufficiently proceed, and the molded product had a low tensile strength. In Comparative Example 12, although a cured product was obtained, good tensile strength could not be obtained because the content of a high-molecular-weight urethane F-3 free of unsaturated groups was high. Also, in Comparative Example 13, the resin composition was not photo-curable since it did not contain a component having unsaturated groups. Thus, photocuring reaction did not proceed, a cross-linked structure was not formed, and the tensile strength and elongation at break were very low.

Examples 70 to 75, Comparative Examples 14, 15

Properties of photo-curable resin compositions C-11 to C-16 and comparative resin compositions H-2 and H-3 as a photo-curable clay were evaluated. The results are shown in Table 5.

The evaluation results of Table 5 show that although the resin compositions C-11 to C-16 for photo-molding of the present invention have a rather high viscosity of from 34 to 59000 Pa·s at 20° C., since they have a loss tangent of from 1 to 10, they are in a liquid state having both elasticity and fluidity at room temperature, i.e., in a clay-like state, and have low tackiness and therefore can be shaped with fingers and are suitable for use as a photo-curable clay. In contrast, the resin compositions of Comparative Examples 14 and 15 have a very low viscosity at 20° C. compared to C-11 to C-16, and the loss tangent could not be measured. Also, the resin compositions of Comparative Examples 14 and 15 were in a starch syrup-like state at room temperature, had high tackiness, and could not be shaped with fingers or be used as a clay. Furthermore, photocuring was performed by using these resin compositions, and the tensile strength and elongation at break of the obtained cured products were measured (Table 5). As a result, cured products of Examples 70 to 75 were confirmed to have good tensile strength and elongation at break, and toughness. In contrast, the tensile strength and elongation at break of the cured product of Comparative Example 14 were too low to be measured. Although the cured product of Comparative Example 15 had a certain extent of tensile strength, the elongation at break was low and the use of the cured product as a molded product was difficult.

Example 76, Comparative Example 16

Cured products of photo-curable resin composition C-15 and comparative resin composition H-3 were used to evaluate the shape memory property. The results are shown in Table 6.

The results in Table 6 show that the cured product obtained from the photo-curable resin composition C-15 of the present invention exhibited high rubber hardness and shape memory property at the same time. In contrast, the cured product obtained from the resin composition of Comparative Example 16 exhibited high rubber hardness but had a low elongation at break and no shape memory property.

TABLE 1

|  |  | Viscosity (Pa · s) | | | Weight average | Type of unsaturated groups |  |
|---|---|---|---|---|---|---|---|
|  |  | 20° C. | 60° C. | 100° C. | molecular weight (Mw) | (average number) | Urethane base structure |
| Urethane prepolymer | A-1 | 2287 | 31.4 | 1.1 | 9100 | Acrylamide group (1.1) Maleimide group (1.0) | Polyether |
|  | A-2 | 321 | 13.2 | 0.5 | 4500 | Maleimide group (2.0) | Polyester |
|  | A-3 | 1299 | 18.1 | 0.6 | 9200 | Vinyl ether group (0.8) Maleimide group (1.2) | Polyester |
|  | A-4 | 496 | 46.5 | 6.4 | 41000 | Acrylate group (3.0) Maleimide group (1.0) | Polyether |
|  | A-5 | 510 | 49.3 | 6.8 | 41500 | Methacrylate group (1.0) Maleimide group (3.0) | Polyether polyester |
|  | A-6 | 3500 | 85.3 | 4.2 | 15400 | Methacrylamide group (0.9) Maleimide group (1.1) | Polyether polycarbonate |
|  | A-7 | 18 | 4.9 | 0.9 | 47200 | Acrylamide group (1.0) Maleimide group (1.0) | Carbinol-modified silicon |
|  | A-8 | 116520 | 395 | 7.0 | 7400 | Acrylamide group (1.1) Maleimide group (1.0) | Polycarbonate |
|  | A-9 | 20800 | 394 | 17.5 | 15200 | Allylether group (1.0) Maleimide group (1.0) | Hydrogenated polybutadiene |
|  | B-1 | 43 | 3.4 | 0.5 | 21500 | Acrylate group (2.0) | Polyether |
|  | B-2 | 666 | 22.5 | 1.6 | 15400 | Acrylamide group (2.0) | Polycarbonate |
|  | B-3 | 683 | 21.8 | 1.5 | 15000 | Acrylate group (2.0) | Polybutadiene |
|  | B-4 | 0.25 | — | — | 520 | Acrylate group (2.0) | Alkylene glycol |
| Urethane compound | F-1 | 0.09 | — | — | 1000 | Acrylate group (2.1) | Polyester |
|  | F-2 | 0.05 | — | — | 1200 | Methacrylate group (3.0) | Polycarbonate |
|  | F-3 | — | — | 3200 | 740000 | — | Polyether |

TABLE 2

|  | Resin composition | Urethane prepolymer (A, B) Urethane compound (F) (mass %) | | | Other (mass %) | | Viscosity (Pa · s) | | |
|---|---|---|---|---|---|---|---|---|---|
|  |  |  |  |  |  |  | 20° C. | 60° C. | 100° C. |
| Ex. 1 | C-1 | A-1 | 95 | B-1 | 2 | D-1 | 3 | 1700 | 23 | 1 |
| Ex. 2 | C-2 | A-1 | 100 | — | — | — | — | 2300 | 31 | 1 |
| Ex. 3 | C-3 | A-1 | 90 | B-1 | 9 | D-2 | 1 | 1200 | 17 | 1 |
| Ex. 4 | C-4 | A-1 | 75 | B-1 | 20 | D-3 | 5 | 470 | 6 | <0.5 |
| Ex. 5 | C-5 | A-1 | 50 | B-1 | 50 | — | — | 97 | 2 | <0.5 |
| Ex. 6 | C-6 | A-1 | 20 | B-1 | 70 | — | — | 20 | 1 | <0.5 |
| Ex. 7 | C-7 | A-2 | 80 | B-1 | 10 | D-4 | 10 | 360 | 15 | 1 |
| Ex. 8 | C-8 | A-2 | 75 | B-1 | 25 | — | — | 270 | 11 | <0.5 |
| Ex. 9 | C-9 | A-2 | 50 | B-1 | 48 | D-5 | 2 | 56 | 3 | <0.5 |
| Ex. 10 | C-10 | A-3 | 100 | — | — | — | — | 320 | 13 | 1 |
| Ex. 11 | C-11 | A-4 | 50 | B-2 | 49.5 | D-6 | 0.5 | 580 | 24 | 1 |
| Ex. 12 | C-12 | A-5 | 50 | B-2 | 50 | — | — | 570 | 24 | 1 |
| Ex. 13 | C-13 | A-6 | 50 | B-2 | 50 | — | — | 2100 | 85 | 3 |
| Ex. 14 | C-14 | A-7 | 50 | B-2 | 49.8 | I-1 | 0.2 | 34 | 14 | 1 |
| Ex. 15 | C-15 | A-8 | 50 | B-2 | 50 | — | — | 59000 | 2400 | 100 |
| Ex. 16 | C-16 | A-9 | 100 | — | — | — | — | 21000 | 390 | 18 |
| Ex. 17 | C-17 | A-1 | 75 | B-3 | 24 | D-1 | 1 | 1900 | 77 | 3 |
| Ex. 18 | C-18 | A-1 | 50 | B-3 | 50 | — | — | 1500 | 61 | 3 |
| Ex. 19 | C-19 | A-2 | 20 | B-3 | 80 | — | — | 810 | 33 | 1 |

TABLE 2-continued

| | Resin composition | Urethane prepolymer (A, B) Urethane compound (F) | | (mass %) | Other | (mass %) | Viscosity (Pa·s) 20° C. | 60° C. | 100° C. |
|---|---|---|---|---|---|---|---|---|---|
| Ex. 20 | C-20 | A-4 | 98 | B-3 | 2 | — | — | 500 | 21 | 1 |
| Ex. 21 | C-21 | A-4 | 90 | B-3 | 9 | I-2 | 1 | 510 | 21 | 1 |
| Ex. 22 | C-22 | A-6 | 75 | B-3 | 25 | — | — | 2800 | 110 | 5 |
| Ex. 23 | C-23 | A-7 | 50 | B-3 | 50 | — | — | 35 | 14 | 1 |
| Ex. 24 | C-24 | A-1 | 25 | B-1 | 25 | D-7 | 50 | 580 | 24 | 1 |
| Ex. 25 | C-25 | — | — | B-1 B-4 | 49.5 50.0 | I-2 | 0.5 | 0.35 | <0.5 | <0.5 |
| Comp. Ex. 1 | H-1 | F-1 | 97 | — | — | I-1 | 3 | 0.09 | — | — |
| Comp. Ex. 2 | H-2 | F-2 | 97 | — | — | I-1 | 3 | 0.05 | — | — |
| Comp. Ex. 3 | H-3 | — | — | — | — | D-2 D-7 I-3 | 65 30 5 | 0.04 | — | — |
| Comp. Ex. 4 | H-4 | F-1 | 7 | F-3 | 90 | I-2 | 3 | — | — | 1500(*1) |
| Comp. Ex. 5 | H-5 | — | — | F-3 | 100 | — | — | — | — | 1600(*1) |

(*1)Viscosity at 150° C. was measured for Comparative Examples 4 and 5.

TABLE 3

| | Resin composition | Dp (mm) | Cure shrinkage (%) | Molding temp. (° C.) | Viscosity (Pa·s) | TI | Molding precision | Cured state |
|---|---|---|---|---|---|---|---|---|
| Ex. 26 | C-1 | 0.18 | 1.7 | 60 | 23 | 0.98 | ○ | ○ |
| Ex. 27 | C-2 | 0.21 | 1.7 | 60 | 31 | 1.03 | ○ | ○ |
| Ex. 28 | C-3 | 1.68 | 1.4 | 60 | 17 | 1.00 | ○ | ○ |
| Ex. 29 | C-4 | 2.36 | 1.1 | 25 | 330 | 1.00 | ○ | ○ |
| Ex. 30 | C-5 | 1.58 | 0.5 | 25 | 65 | 1.00 | ⊙ | ○ |
| Ex. 31 | C-6 | 1.11 | 0.4 | 25 | 16 | 0.99 | ⊙ | ○ |
| Ex. 32 | C-7 | 0.70 | 1.4 | 60 | 15 | 1.03 | ○ | ○ |
| Ex. 33 | C-8 | 0.79 | 0.8 | 60 | 11 | 1.04 | ⊙ | ○ |
| Ex. 34 | C-9 | 0.88 | 0.5 | 80 | 0.6 | 1.02 | ○ | ○ |
| Ex. 35 | C-10 | 0.53 | 0.2 | 60 | 13 | 1.02 | ⊙ | ○ |
| Ex. 36 | C-11 | 1.13 | 0.2 | 60 | 24 | 1.01 | ⊙ | ○ |
| Ex. 37 | C-12 | 1.88 | 0.2 | 60 | 24 | 1.03 | ⊙ | ○ |
| Ex. 38 | C-13 | 1.12 | 0.4 | 60 | 85 | 1.02 | ⊙ | ○ |
| Ex. 39 | C-14 | 2.01 | 0.1 | 60 | 14 | 1.05 | ⊙ | ○ |
| Ex. 40 | C-15 | 1.95 | 1.0 | 80 | 920 | 1.09 | ○ | ○ |
| Ex. 41 | C-16 | 2.63 | 0.4 | 80 | 260 | 1.05 | ⊙ | ○ |
| Ex. 42 | C-17 | 0.92 | 1.2 | 80 | 25 | 1.06 | ○ | ○ |
| Ex. 43 | C-18 | 2.12 | 0.9 | 60 | 61 | 1.03 | ⊙ | ○ |
| Ex. 44 | C-19 | 1.92 | 0.6 | 60 | 33 | 1.02 | ⊙ | ○ |
| Ex. 45 | C-20 | 0.87 | 0.2 | 60 | 21 | 1.01 | ⊙ | ○ |
| Ex. 46 | C-21 | 0.34 | 0.2 | 60 | 21 | 1.00 | ○ | ○ |
| Ex. 47 | C-22 | 1.86 | 0.4 | 80 | 12 | 1.03 | ⊙ | ○ |
| Ex. 48 | C-23 | 0.32 | 0.1 | 60 | 14 | 1.02 | ○ | ○ |
| Ex. 49 | C-24 | 0.58 | 1.8 | 60 | 24 | 1.01 | ○ | ○ |
| Ex. 50 | C-25 | 0.32 | 4.9 | 25 | 0.3 | 1.03 | Δ | ○ |
| Comp. Ex. 6 | H-1 | <0.01 | 6.4 | 25 | 0.08 | 1.00 | X | Δ |
| Comp. Ex. 7 | H-2 | <0.01 | 7.2 | 25 | 0.04 | 1.00 | X | X |
| Comp. Ex. 8 | H-3 | 0.08 | 9.5 | 25 | 0.03 | 1.00 | Δ | X |
| Comp. Ex. 9 | H-4 | 0.26 | 0.4 | 150 | 1500 | 2.10 | X | Δ |
| Comp. Ex. 10 | H-5 | <0.01 | — | 150 | 1600 | 3.20 | X | X |

TABLE 4

| | Resin composition | Tensile strength (Mpa) | Elongation at break (%) |
|---|---|---|---|
| Ex. 51 | C-1 | 1.8 | 50 |
| Ex. 52 | C-2 | 1.9 | 60 |
| Ex. 53 | C-3 | 2.0 | 70 |
| Ex. 54 | C-4 | 2.2 | 80 |
| Ex. 55 | C-5 | 2.4 | 120 |
| Ex. 56 | C-6 | 2.8 | 100 |
| Ex. 57 | C-7 | 2.8 | 60 |
| Ex. 58 | C-8 | 2.5 | 125 |
| Ex. 59 | C-9 | 3.2 | 35 |
| Ex. 60 | C-10 | 5.0 | 150 |
| Ex. 61 | C-17 | 2.0 | 60 |
| Ex. 62 | C-18 | 2.5 | 100 |
| Ex. 63 | C-19 | 2.2 | 130 |
| Ex. 64 | C-20 | 2.3 | 130 |
| Ex. 65 | C-21 | 1.9 | 140 |
| Ex. 66 | C-22 | 11.8 | 45 |
| Ex. 67 | C-23 | 1.5 | 120 |
| Ex. 68 | C-24 | 1.9 | 70 |
| Ex. 69 | C-25 | 6.0 | 25 |
| Comp. Ex. 11 | H-1 | 0.8 | 0.0 |

TABLE 4-continued

| | Resin composition | Tensile strength (Mpa) | Elongation at break (%) |
|---|---|---|---|
| Comp. Ex. 12 | H-4 | 0.9 | 25 |
| Comp. Ex. 13 | H-5 | 0.6 | 1.0 |

TABLE 5

| | Resin composition | | | | Cured product | |
|---|---|---|---|---|---|---|
| | | Viscosity 20° C. (Pa · s) | tanδ | Tackiness | State | Tensile strength (Mpa) | Elongation at break (%) |
| Ex. 70 | C-11 | 580 | 2.3 | ○ | Clay-like | 5.5 | 80.0 |
| Ex. 71 | C-12 | 570 | 2.7 | ○ | Clay-like | 6.5 | 75.0 |
| Ex. 72 | C-13 | 21000 | 2.2 | ○ | Clay-like | 12.5 | 55.0 |
| Ex. 73 | C-14 | 34 | 2.8 | ○ | Clay-like | 5.5 | 100.0 |
| Ex. 74 | C-15 | 59000 | 2.1 | ○ | Clay-like | 20.0 | 40.0 |
| Ex. 75 | C-16 | 21000 | 6.7 | Δ | Clay-like | 3.0 | 100.0 |
| Comp. Ex. 14 | H-2 | 0.05 | — | X | Starch syrup-like | 0.0 | 0.0 |
| Comp. Ex. 15 | H-3 | 0.03 | — | X | Starch syrup-like | 19.0 | 2.5 |

TABLE 6

| Examples | Resin composition | Rubber hardness | Shape memory property |
|---|---|---|---|
| Ex. 76 | C-15 | D78 | ○ |
| Comp. Ex. 16 | H-3 | D76 | X |

INDUSTRIAL APPLICABILITY

As explained above, the photo-curable resin composition of the present invention has high coefficient of curing depth, has no odor problem during or after curing, does not require washing of the molded product, has no problem in terms of yellowing of the cured product or generation of eluted substances, has high curability to light, and can be photo-molded with good curing ratio and curing depth from thin films to thick films even with a low integrated light quantity. Also, the obtained cured product has no surface tackiness, has high safety, excellent flexibility, toughness, strength, elongation and shape memory property, and can be suitably used as a 3D printing material or a photo-curable clay, for example, in various fields such as prototyping or producing structures. In addition, the photo-curable resin composition of the present invention can also be used as paint or coating materials, materials for elastomers, adhesives, sealing materials, dental health materials, optical materials, photo-molding materials, materials for reinforced plastics, and shape-memory resin materials.

The invention claimed is:

1. A resin composition for three-dimensional photo-molding having a viscosity at 20° C. of 10 Pa·s or more and a viscosity at 150° C. of 1000 Pa·s or less and containing 50 to 100% by mass of a group of unsaturated compounds consisting of compounds having one or more unsaturated groups in a molecule and 0 to 50% by mass of a photoinitiator, wherein the unsaturated groups in the unsaturated compounds contain one or more maleimide groups.

2. The resin composition for three-dimensional photo-molding according to claim 1 having a curing shrinkage of 5% or less.

3. The resin composition for three-dimensional photo-molding according to claim 1 having a thixotropic index of 0.9 to 1.1.

4. The resin composition for three-dimensional photo-molding according to claim 1 having a coefficient of curing depth of 0.1 mm or more.

5. The resin composition for three-dimensional photo-molding according to claim 1 further comprising one or more unsaturated groups selected from a (meth)acrylate group, a (meth)acrylamide group, a vinyl group, and an allyl group.

6. A photo-curable ink comprising the resin composition according to claim 1 and having a viscosity at 20° C. of 0.2 Pa·s or more.

7. A photo-curable shape-memory resin composition comprising the resin composition according to claim 1.

8. A photo-curable clay comprising the resin composition according to claim 1.

9. A three-dimensional photo-molding method comprising simultaneously dispensing the resin composition according to claim 1 from a nozzle in the form of a sol and curing the resin composition by light irradiation.

10. A three-dimensional photo-molded product obtained by curing the resin composition for three-dimensional photo-molding according to claim 1 by light irradiation.

11. A shape-memory molded product obtained by curing the photo-curable shape-memory resin composition according to claim 7 by light irradiation.

12. A clay molded product obtained by curing the photo-curable clay according to claim 8 by light irradiation.

13. A three-dimensional photo-molding method comprising simultaneously dispensing the photo-curable ink according to claim 6 from a nozzle in the form of a sol and curing the photo-curable ink by light irradiation.

14. A three-dimensional photo-molded product obtained by curing the photo-curable ink according to claim 6 by light irradiation.

15. The resin composition for three-dimensional photo-molding according to claims 1, wherein the unsaturated compounds comprise a urethane prepolymer.

16. The resin composition for three-dimensional photo-molding according to claim 15, wherein the urethane prepolymer has a weight-average molecular weight of from 300 to 100000.

* * * * *